United States Patent [19]

Ward

[11] Patent Number: 5,420,893

[45] Date of Patent: May 30, 1995

[54] ASYNCHRONOUS DATA CHANNEL FOR INFORMATION STORAGE SUBSYSTEM

[75] Inventor: Thomas J. Ward, Eastleigh, United Kingdom

[73] Assignee: International Business Machines Corporation, Armonk, N.Y.

[21] Appl. No.: 585,072

[22] PCT Filed: Feb. 16, 1989

[86] PCT No.: PCT/GB89/00184
§ 371 Date: Oct. 12, 1990
§ 102(e) Date: Oct. 12, 1990

[87] PCT Pub. No.: WO90/09664
PCT Pub. Date: Aug. 23, 1990

[51] Int. Cl.⁶ .............................................. H04L 7/00
[52] U.S. Cl. ................................. 375/368; 375/354; 369/13
[58] Field of Search ............... 375/106, 113, 116, 117, 375/119, 120; 369/13

[56] References Cited

U.S. PATENT DOCUMENTS 4,791,652 12/1988 McEachern et al. ................ 375/111
4,928,275 5/1990 Moore et al. ......................... 370/102
5,119,406 6/1992 Kramer .................................. 375/118

Primary Examiner—Stephen Chin
Assistant Examiner—T. Ghebretinsae
Attorney, Agent, or Firm—J. Michael Anglin

[57] ABSTRACT

An asynchronous data channel for a disk drive reads fields of data synchronized at a bit frequency which are separated by adjustment regions having two different patterns of control signals. Each pattern repeats at a different submultiple of the bit frequency. The channel derives two clock signals at the two submultiple frequencies, and produces a synchronizing signal related to the phase coincidence of the two clock signals. The synch signal indicates the start of the dam field. The channel can also produce the control-signal patterns and write them to a disk.

8 Claims, 9 Drawing Sheets

ASYNCHRONOUS DATA CHANNEL FOR INFORMATION STORAGE SUBSYSTEM

TECHNICAL FIELD OF THE INVENTION

This invention relates generally to asynchronous data channels and to methods of generating and detecting asynchronous data signals in such channels. More specifically, the invention also relates to information storage subsystems of the moving medium type including such a data channel.

BACKGROUND OF THE INVENTION

In disk storage subsystems, concentric information bearing tracks on the disks are usually formatted in one of two ways. In Fixed block architecture, information is stored in fixed length Data Fields preceded by fixed length identifier (ID) fields. In Count, Key, Data (CKD) architecture, information is stored in Data fields of variable length, preceded by a Key field which identifies the following Data field and a Count field which specifies its length. In both cases the fields are separated by gaps which contain control information.

Although the data within each field is synchronous, successive fields are not guaranteed to be perfectly synchronized with each other. Accordingly, the information in the gap regions includes synchronizing information for synchronizing the circuitry which reads and/or writes the subsequent fields.

Generally, the synchronizing information is of two types known as "Bit Sync" and "Byte Sync" information. The purpose of the Bit Sync information is to synchronize a phase locked oscillator (PLO) to the bit rate of the subsequent field to allow data to be latched and decoded. The purpose of the Byte Sync field information is to synchronize a data register in a serializer/deserializer (Serdes) with byte boundaries in the subsequent fields.

One example of this prior art is the IBM 3310 Direct Access Storage which employs a disk file formatted in Fixed Block Architecture. In the disk file, the gaps preceding the ID and Data fields include a "Lead-In" field containing up to 16 bytes of logical zeroes (coded to include clock information) which is the Bit Sync information employed to synchronize clocks in the read or write circuits to the bit rate of the data in the Data fields. Following this, is a non-zero eight bit Sync Byte which decodes to binary 00000001. A ring counter used to partition the serial data in the data field into eight bit bytes synchronized with the least significant bit of the sync byte.

Because of the potential for error in decoding the single '1' bit of the Sync Byte and thus failing to synchronize with the following field correctly, more complex Sync Byte patterns have also been employed and the Sync Byte itself repeated. More complex "soft" decoding logic for such Sync Bytes can be used which is tolerant of a limited number of bits in error.

The 3310 employed relatively simple MFM (modified frequency modulation) encoding for data. More recent disk storage has employed 2, 7 RLL (Run-Length-Limited) codes in which analogous problems arise. An article by R E Jenkins entitled "2F/2F Phase Alignment System" (IBM Technical Disclosure Bulletin Vol. 23, No. 1, June 1980, p 318) shows a technique for phase aligning 1F and 2F clocks in a 2, 7 RLL channel by examining whether the bit sync information recorded over two bytes decodes correctly.

The need for byte synchronization also occurs in channels of the Partial Response Maximum Likelihood (PRML) type which are well known in the telecommunications field and have also been proposed for information storage subsystem data channels. A PRML channel for information storage applications is described in U.S. Pat. No. 4,571,734. In such channels, also known as Viterbi channels, the read back signal must be equalized to ensure it is in a standardized form for sampling. This is necessary to enable the PRML decoder to estimate the most likely digital signal sequence to have producted the sampled and digitized analog read back signal. It is known to make the equalization adaptive by including in the gaps between data fields in the signal sequence a succession of "training" bytes. Typically, the equalization pattern is a repetitive pattern with as wide a variation of frequency components as possible.

The problem of the byte or "frame" or "word" synchronization also occurs in PRML channels as described in GB 1478736, GB 2123654A, EP 0139511A2 and EP 0208537A2. The PRML channels described in these patents and applications are employed in telecommunications applications. The use of specially coded frame synchronization signals is discussed but the described approach is to attempt, instead, to achieve and then maintain frame synchronism by comparing "branch metrics" computed in the Viterbi decoder. If these differ from predetermined threshold values, sychronism has been lost and a phase adjustment is made. Although, this approach offers the possibility of dispensing with frame or byte synchronizing information interleaved with data, it does so at the expense of occasional periods of incorrect decoding as the decoder drifts out of synchronism. It thus offers less reliable decoding that the approach of splitting data into asynchronous fields, each preceded by its own sychronizing information.

The prior art, therefore, trades off reliability at the expense of overhead in data transmission. While this may not matter in digitally coded voice transmissions, it may be quite unacceptable in applications where the digital data must not be corrupted.

DISCLOSURE OF THE INVENTION

Accordingly, the present invention provides an asynchronous data channel comprising means for detecting an asynchronous signal in which fields of data, which are synchronous within the field at a bit rate frequency, are separated by adjustment regions, the adjustment regions including a first pattern of control signals which repeats at a first submultiple of the bit rate frequency and a second pattern of control signals which repeats at a second submultiple of the bit rate frequency, means for deriving from said first pattern a first clock signal at said first submultiple frequency, means for deriving from said second pattern a second clock signal at said second submultiple frequency, and means for detecting phase coincidence of said first and second clock signals and producing a synchronizing signal, in fixed time relationship to said coincidence detection, which synchronizing signal indicates the start of the data field.

The indication of the start of the data field is the equivalent of the Byte, Frame or Word Sync signals produced in the prior art. However, the generation of this signal by phase coincidence rather than comparison of byte bit patterns offers both simplicity and reliability as compared with prior approaches.

The invention is particularly useful in channels of the partial response maximum likelihood type which include means for sampling the asynchronous signal, an adaptive equalizer for equalizing the sampled asynchronous signal in accordance with an adjustment signal supplied at a control input thereof and a maximum likelihood estimator for determining from the equalizer output the likeliest binary sequence to have produced the asynchronous signal. In such a channel the invention preferably provides adjustment means for responsive to the equalizer output from said second pattern of control signals to generate such an adjustment signal and apply it to said equalizer control input.

The advantage of this arrangement is that no separate (dedicated) byte synchronization information need be provided. Instead the phase information which is employed to indicate start of the data field is incorporated in existing training information for the adaptive equalizer.

In the preferred arrangement, the means for deriving the first clock signal includes a phase locked oscillator arranged to lock to the phase of said first pattern of control signals, and the means for deriving the second clock signal includes a clocked ring counter.

It is further preferred that the means for deriving the second clock signal includes a pattern recogniser for recognising said second pattern of control signals and whose output is connected as an input to said ring counter to synchronize the output of the ring counter with said second pattern.

In this arrangement, it is preferred that the channel include inhibiting means responsive to a predetermined number of subsequent recognitions of said second patterns of control signals in coincidence with the output of the ring counter to inhibit further output from the pattern recogniser.

Although applicable to any data channel, for example in the telecommunications field, the invention finds its principal application in an information storage subsystem of the moving medium type including interface means for passing data to and from an external system and a data channel such as is disclosed above, the data channel including a movable information storage medium and said detecting means including transducing means for reading information from and/or writing information on the storage medium during motion thereof.

Such an information storage subsystem could be, for example a magnetic or optical disk storage subsystem or a magnetic tape subsystem.

In such an information storage subsystem according to the invention, the interface means preferably includes formatting means for dividing data from said external systems into a serial data train comprising alternate data and adjustment portions and the data channel includes write circuitry responsive to the serial data train to generate a corresponding asynchronous signal for recording comprising data signals which are synchronous at said bit rate frequency separated by adjustment signals confirming first and second control signal patterns, the first pattern repeating at a first submultiple of the bit rate frequency and the second pattern repeating at a second submultiple of the bit rate frequency, the phase relationship of the first and second patterns being such as to produce a phase coincidence at the end of the second pattern which indicates the start of the subsequent data signals.

Linked to the above concepts, the invention also provides a method of generating an asynchronous data signal comprising data fields, within which data is synchronous at a predetermined bit rate frequency, the fields being separated by adjustment regions, the method comprising generating serially in the adjustment regions first and second control signal patterns at said predetermined bit rate frequency, the first pattern repeating at a first submultiple of the bit rate frequency and the second pattern repeating at a second submultiple of the bit rate frequency the phase relationship of the first and second patterns being such as to produce a phase coincidence at the end of the second pattern, and writing the subsequent data field at said bit rate frequency starting at a time determined by said coincidence in phase.

The invention also provides a conceptually linked method of detecting data in an asynchronous signal generated by the above method comprising the steps of deriving from said first control signal signal pattern a first clock signal at said first submultiple frequency, deriving from said second control signal pattern a second clock signal at said second submultiple frequency, detecting a phase coincidence between said first and second clock signals to indicate the start of the data field; and separating signals in said data field from said control signals for further processing.

Corresponding to apparatus according to the invention the preferred method of detection includes the steps of sampling the asynchronous signal, equalizing the signal samples; feeding back equalized samples corresponding to said second control signal pattern; adjusting said equalization step adaptively in accordance with said fed back samples; and applying the adaptively equalized samples to a maximum likelihood sequence estimator.

From the above, it will be understood that the invention comprises a number of linked concepts not all of which must be present in any one piece of equipment. In the telecommunications field, for example, transmitters of asynchronous data generated according to the invention may be made and sold quite separately from receivers of asynchronous data which detect data according to the invention.

Also not all information storage subsystems according to the invention need have provision for both generation and detection of asynchronous data. This could depend on whether they are read—only subsystems, as for example some optical storage devices, or are capable of reading and writing information as for example most magnetic disk and tape storage systems.

BRIEF DESCRIPTION OF THE DRAWINGS

The invention will now be described further, by way of example only, with reference to the following drawings, in which.

DETAILED DESCRIPTION OF THE INVENTION

The specific example of asynchronous data channel according to the invention to be described is a so-called Partial-Response Maximum Likelihood (PRML) channel employed in a magnetic disk storage subsystem. Before describing the actual implementation of the invention, a disk file PRML subsystem will be described in general terms.

Figure 1:
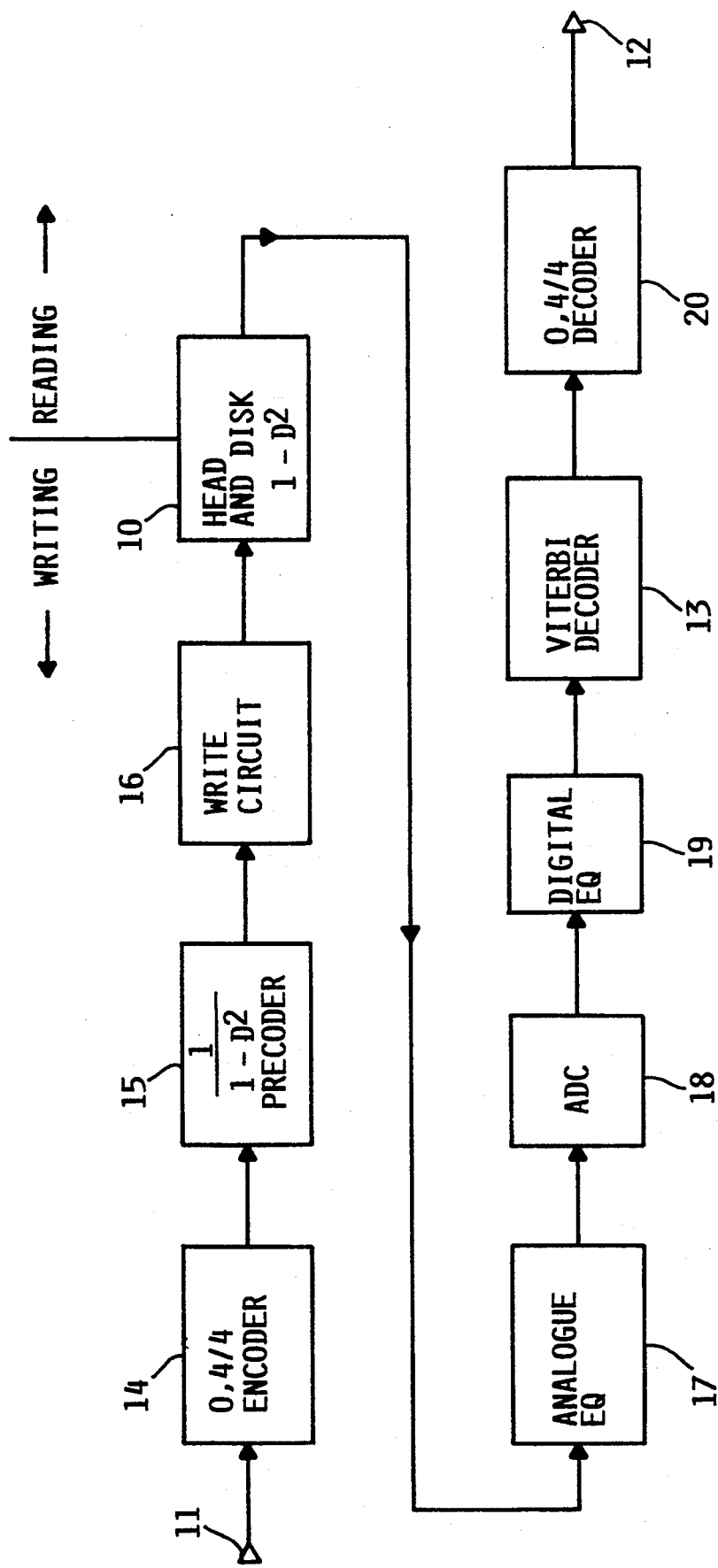
FIG. 1 is a schematic block diagram of a PRML data channel for a disk file.

The PRML data path is illustrated in FIG. 1 and shows the recording on and reading back of data from a conventional magnetic disk by means of a magnetic transducing head. The head and disk combination is schematically represented by block 10.

The path to the left of block 10 is the write (recording) data path which receives data in NRZ0 form at input 11 from a subsystem interface with an external data processor. The path to the right of the head and disks is the read data path which provides data in NRZ1 form back to the interface at output 12.

The heart of the PRML data path is the Viterbi decoder 13. This is a known maximum likelihood sequence estimator which, in response to digitized samples of an input analog waveform, determines the most likely binary sequence to have given rise to the waveform. The estimator does this by minimizing the sum of the squares of the errors in the sampled points, which should have one of three trinary values ($+1$, 0 and $-1$), consistent with the magnetic constraint that some patterns (eg $+1$, X, $+1$) are impossible.

Figure 2:
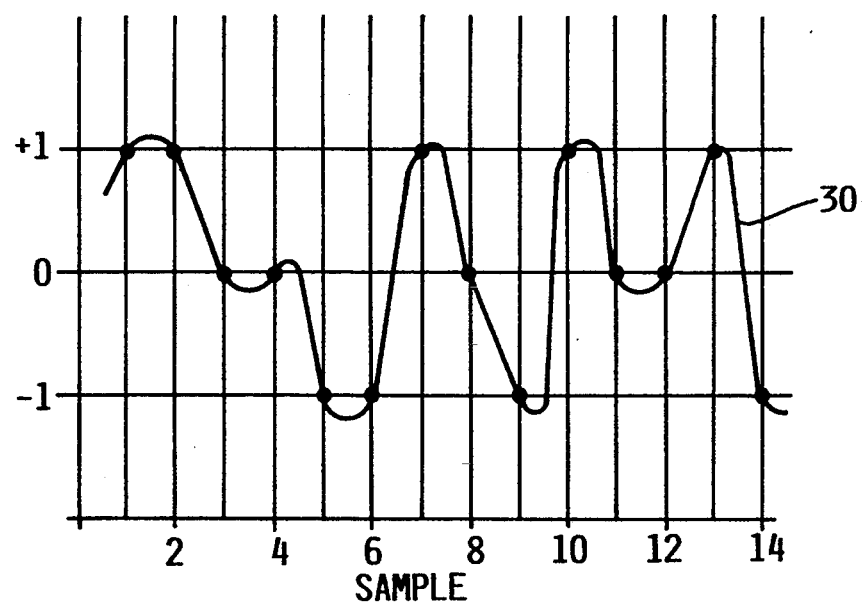
FIG. 2 illustrates the sampling and decoding of a read back waveform in the channel of FIG. 1.

An example of an ideal PRML analog waveform 30 is shown in FIG. 2 in which the three trinary levels can be seen. It will be clear that the actual sampled values will differ from the ideal as a result of amplitude variations in the read back signal and time shift relative to the sampling points. As shown in FIG. 2, the Viterbi algorithm output is a binary waveform (encoded read data) in which the $\pm 1$ values of the trinary waveform determined to be the most likely are replaced by 1's.

In order for the particular Viterbi algorithm employed to work, it is necessary for the input NRZ0 data to be encoded to satisfy certain constraints by an encoder 14. The encoder converts the input NRZ0 data streams to a (0, 4/4) rate 8/9 run length limited code. The (0, 4/4) constraints define the minimum and maximum number of successive zeroes between consecutive ones. Thus, the minimum number of zeroes is 0. The maximum number of consecutive zeroes is 4. The second 4 indicates that the maximum number of zeroes between consecutive ones within the set of even bits and within the set of odd bits is also 4. The encoder produces nine encoded bits for every eight input bits. Hence the rate of the code is 8/9.

Figure 3:
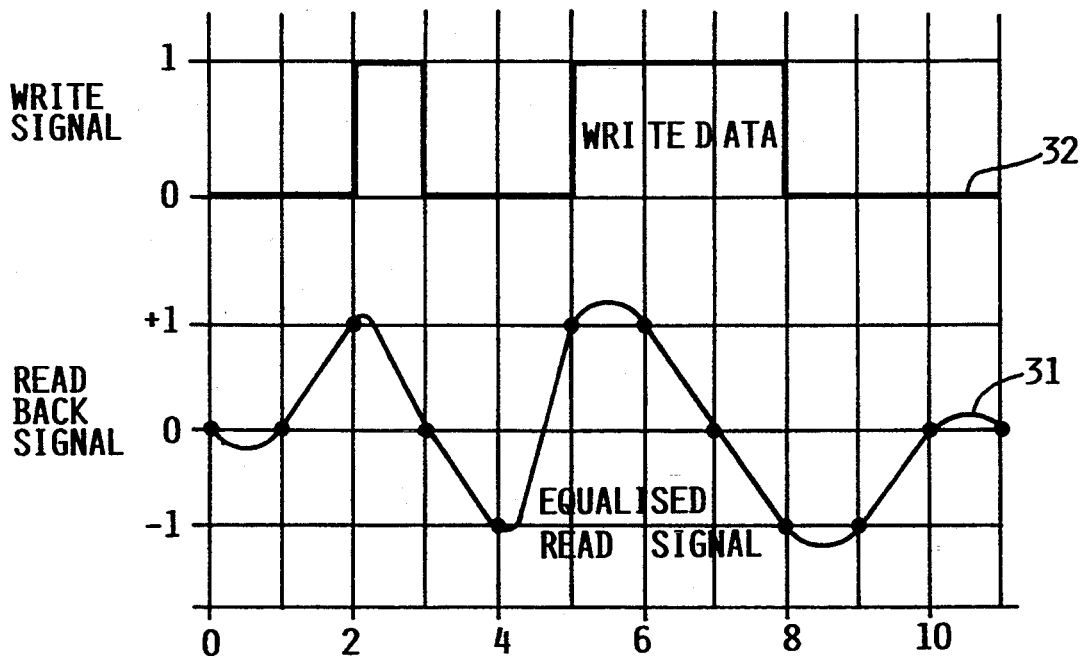
FIG. 3 illustrates the precoding function in the channel of FIG. 1.

Because of the transfer function of the actual head/disk interface during the readback process, it is necessary to further precode the encoded bit stream in precoder 15. The relationship of the read back signal 31 to the write signal 32 is illustrated in FIG. 3, where it can be seen to be represented by an operation $1-D^2$ where $D^2$ is the value of the last bit but one. The function of the precoder 15 is to apply the inverse of this operation, $1/(1-D^2)$, to the bit stream from the encoder 14 so that the read back signal corresponds correctly to (0, 4/4) encoded data.

After precoding, write circuit 16 converts the encoded and precoded write data logic signal to an appropriate two level drive current applied to the selected magnetic head.

In the readback data path, the readback analog signal is passed through a conventional analog equalizer 17 before it is sampled and digitized by analog-to-digital converter 18. The accuracy of the maximum likelihood sequence estimation depends on the input to the sequence estimator 13 being as standard as possible despite variations in read back conditions. For this reason, a further digital equalizer 19 is provided which equalizes the digitized sample values prior to application to estimator 13. This equalizer and its operations are described in more detail with reference to FIG. 8 below.

Finally, the still encoded read data from the estimator is decoded by (0, 4/4) decoder 20 into NRZ1 form for transmission back to the subsystem interface.

A complete description of the Viterbi algorithm is unnecessary for the purpose of describing the present invention. However, a full description using the same encoder and precoder, may be found in U.S. Pat. No. 4,571,734 entitled "Method and Apparatus for Decoding the Output Signal of a Partial-Response Class-IV Communication or Recording-Device Channel", F. B Dolivo et al, assigned to International Business Machines Corporation.

Figure 4:
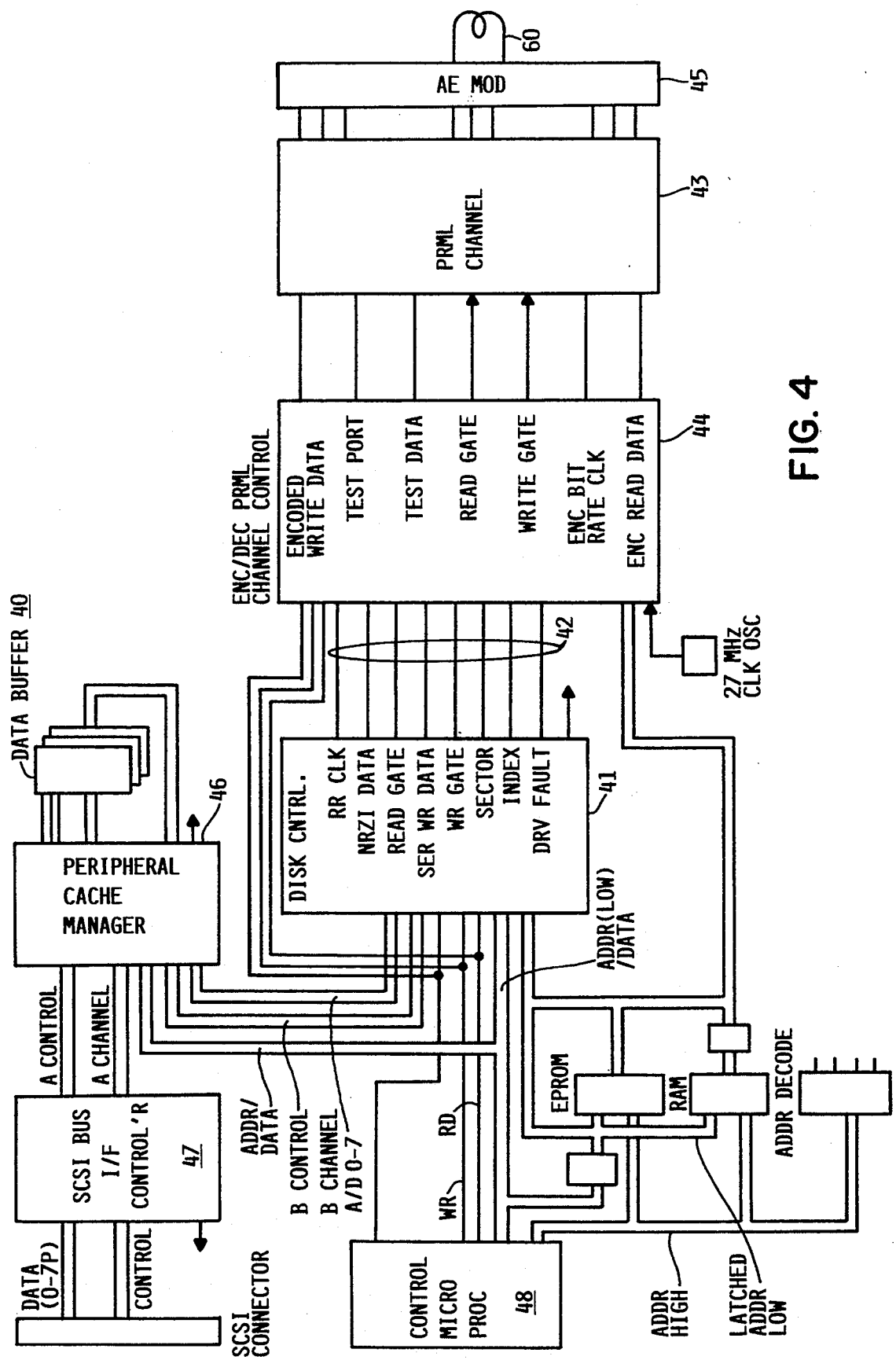
FIG. 4 is a schematic block diagram of a disk storage subsystem incorporating an asynchronous data channel according to the invention.

Having now described the operation of the PRML data channel, in general terms, FIG. 4 shows schematically the major circuit components of a PRML data channel and an associated interface in a magnetic disk storage subsystem. Essentially, parallel NRZ0 data from the host system, buffered by a data buffer 40, and additional control data from a disk controller 41 are transferred to and from a PRML data channel on bus 42 as serial NRZ0 signals. The PRML data channel consists of two chips 43 and 44. Chip 43 is known as the PRML channel chip and, with reference to FIG. 1, contains the equalizer, ADC and sequence estimator components. Chip 44, known as the PRML channel control chip contains the encoder, decoder and precoder, as well as performing various control functions to be described. The write circuit 16 of FIG. 1, is part of an arm electronics module 45 which is physically located on the magnetic head support arm and which supplies write current to and preamplifies read voltage from a selected head such as head 60.

The data buffer 40 is connected to a buffer manager 46, which, together with an interface chip 47 and the disk controller chip 41, form an SCSI (Small Computer Systems Interface). The SCSI interface conforms to the ANSI X 3.131-1986 standard and the three chips 41, 46, 47 are commercially available from Western Digital Corp. (part nos. WD10C00, WD60C40 and WD33C93). The three chips are associated with and controlled by a microprocessor 48 to respond to commands applied to interface chip 47. Such commands, which are defined in the SCSI standard, include commands to read or write data from the disk file which data is transferred along with the associated control signals on bus 42.

Figure 5:
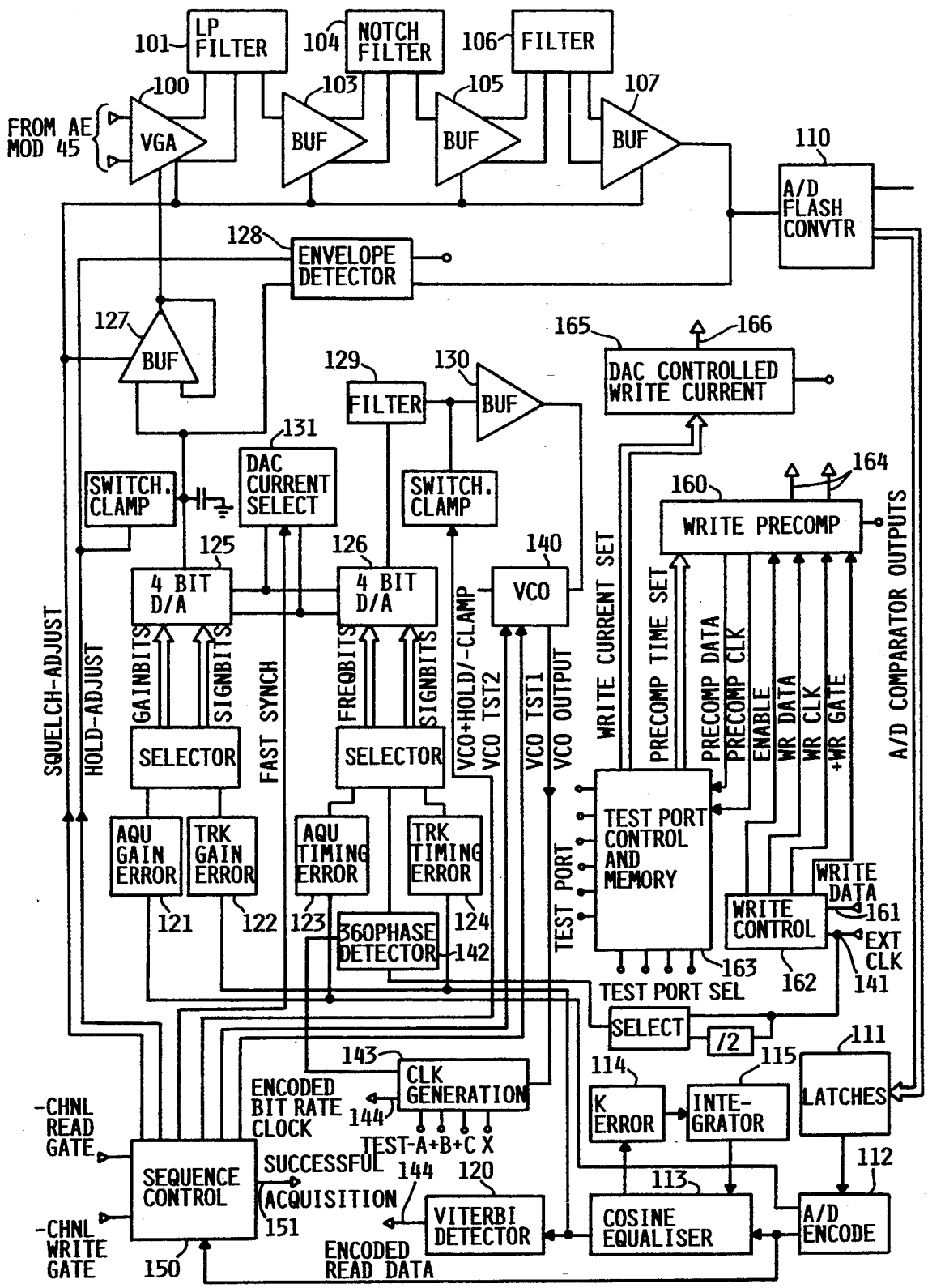
FIG. 5 is a detailed block diagram of a PRML channel circuit forming part of the data channel of FIG. 1.

The PRML channel chip 43 is shown in block diagram form in FIG. 5. Its overall structure and operation is as follows.

The read back signal from the head 60 (FIG. 4) is amplified by the AE module 45 and is the input to a VGA (Variable Gain Amplifier) 100. The differential outputs of the VGA 100 are driven into an off chip low-pass filter 101 and then buffered by amplifier 103. The output of this buffer is then driven into a "notch" filter 104 which in turn drives a second buffer 105. This last buffer stage feeds the input to an "all-pass" filter 106, which is used to restore any phase shift caused by the other filter sections. The output of this filter then feeds a flash analog to digital converter 110 via buffer 107. This signal is then sampled by the flash A/D Converter and the sample values are latched by latches 111 and encoded to a 6 bit word by encoder 112. This digital representation of the disk signal is then passed to the digital cosine equalizer 113. A feedback loop consisting of an error detector 114 and integrator 115 renders the equalizer 113 adaptive.

After equalization the Viterbi detector 120 determines iteratively whether a one or zero is present. This detector continuously updates decisions about the binary detection. Due to the interference of adjacent bits, the detector must continually take new samples and update old estimates of the actual bit pattern it is attempting to read. The output of the Viterbi Detector is the ENCODED READ DATA signal which is the main data output of the module.

The A/D encoded output is also passed to gain logic 121,122 and frequency logic 123,124 which determine timing and gain corrections needed in acquisition and tracking modes. Two main control loops are used to accurately detect the data and synchronize the clocking. Two 6 bit words are output from these control blocks which drive the frequency and gain D/A converters 125 and 126. The output of the gain D/A drives an external capacitor whose voltage is buffered by a unity gain amplifier and subsequently fed back to the VGA circuit. An envelope detector block 128 can be switched to the gain control loop to supply gain information to the channel when the channel is not reading or writing.

The output of the frequency D/A 126 drives a filter 129. This voltage is subsequently buffered by a transconductance circuit 130 whose output current feeds VCO 140 to form a phase locked loop. Both D/A converters have a FAST SYNC mode which multiplies the output current. This high current mode is used during lock-on. External resistors set the "normal" LSB current and the "FAST SYNC" LSB current out of both D/A's via DAC current select 131. The VCO buffer 130 also has two external resistors which determine the loop gain and centre frequency of the VCO.

Clocking for the module is generated by the VCO 140 during a read operation. The VCO continuously adjusts itself to line up with the data. In non-reading conditions, an external crystal clock is provided at terminal 141 and a 360 deg. phase detector 142 drives the frequency D/A converter 126 to keep the VCO close to lock on. On a subsequent read cycle, the VCO can then acquire lock-on quite quickly. The module is designed to run at a VCO frequency of 54 Mhz. When the VCO run at 54 MHZ clock generation logic 143 does a divide by two and generates a 27MHZ ENCODED BIT RATE CLOCK at output 144. The clock generation logic 143 controls the main clocking for the chip.

An external signal, —CHANNEL RD GATE from the microprocessor, causes the module to go into a READ operation. A further signal, —CHANNEL WRITE GATE, is used to control certain channel functions with respect to file WRITE operation. The VGA, gain buffer, DC Restore and envelope detector functions are shut down during a WRITE operation since data is not valid.

A sequence controller 150 determines the state of control lines to the analog section of the chip. A SUCCESSFUL ACQUISITION signal, produced by the sequence controller, goes high during a normal READ operation when the data has been locked-on in a sync field and is output from the chip at terminal 151.

The module is also equipped with a digitally programmable write precompensation circuit 160 for shifting the written data transitions slightly. Write data is input at terminal 161 to a Write Control circuit 162. Precompensation values are input via Test port control and memory 163. An external resistor sets the maximum amount of precompensation skew in circuit 160. This maximum precompensation value is broken into eight discrete values which are programmed by 3 bits internal to the module. Precompensated WRITE data exits the module differentially at terminals 164.

A DAC Controlled Write Current Source 165 is also a feature of this module. This value of the output current at terminal 166 is controlled by four bits selected through the test port. An external resistor determines the base increment current.

Figure 6:
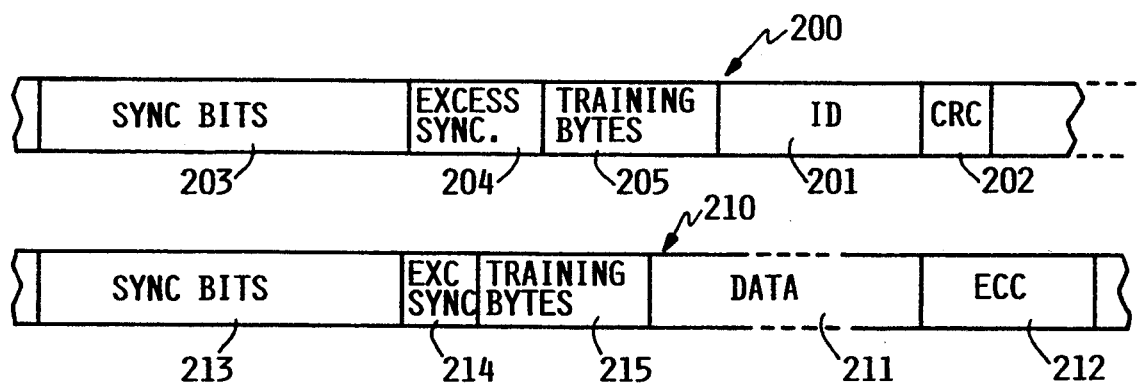
FIG. 6 illustrates the data track format employed in the subsystem of FIG. 4.

In order to explain aspects of the PRML channel pertaining to the invention, it is necessary to consider the format of the disk tracks. This format is illustrated in FIG. 6.

The format is known as a fixed block format in which data is recorded in fixed length data fields each preceded by a shorter fixed length identifier or ID field. The ID field 200 includes a unique identifier 201 six bytes in length, followed by two bytes 202 of CRC (cylic redundancy check). The identifier 201 uniquely identifies the sector number on the disk surface in which the following data field 210 lies. The identifier is normally read to confirm the head is over the correct sector before a reading or writing operation takes place.

In the data field, data is stored in, typically, a 512 or 520 byte user data region 211. This is followed by six ECC (Error checking and correction) bytes 212 to permit certain errors in the data to be detected and corrected.

The PRML channel, like all magnetic recording channels, is asynchronous to the extent that the clocking circuitry used to detect, latch and decode the ID and user data must be resynchronized before each field. In order to do this, the portions of each field containing variable information must be preceded by synchronizing information. In the present case this consists, for both ID and Data fields, of twelve bytes of sync bits 203,213 followed, after excess sync regions 204, 214, by five training bytes 205,215 having the dual purpose of providing not only training information to the digital adaptive equalizer 113 (FIG.5) but also timing information which, together with the sync bit information, defines a "Byte Sync" condition corresponding to the start of Identifier 201 or user data 211, as the case may be.

Figure 7:
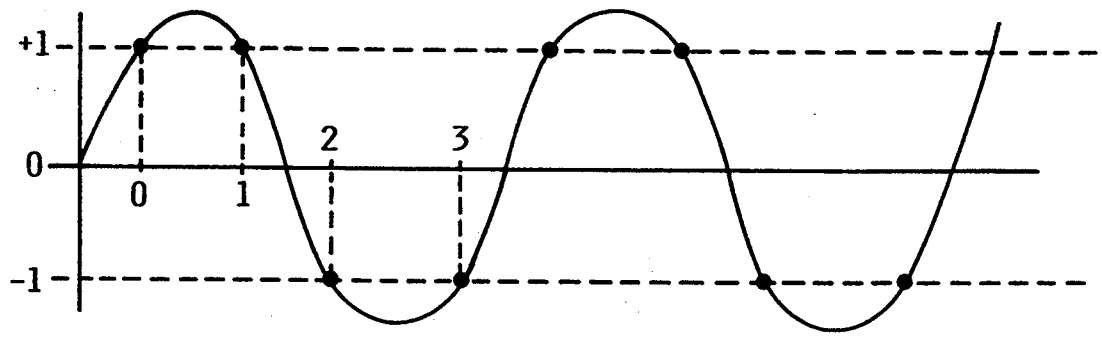
FIG. 7 shows a bit rate synchronizing waveform employed in the circuit of FIG. 5.

The sync bit pattern is decoded by the Viterbi decoder 120 (FIG. 5) as a series of successive 1's. However, the readback signal from the disk after equalization in digital cosine equalizer 113, is actually a four bit repeating trinary pattern with the sequence +1, +1, −1, −1, the trinary equivalent of a sine wave as illustrated in FIG. 7. This pattern has four phases which can be detected from the trinary values but are lost in the Viterbi detection process whose output is purely binary. The timing error circuit 124 (FIG. 5) is fed directly with the equalized signal from equalizer 113 to synchronize the VCO 140 such that each sample time of the bit sync waveform occurs at the same respective phase of the VCP output. The synchronized VCO output is used by the clock generation circuitry to produce the ENCODED BIT RATE CLOCK signal at output 144.

The bit sync operation is deemed successful if, after counting 12 bytes from READ GATE, 15 consecutive correctly decoded 1's are produced by the Viterbi decoder in the last four bytes of the sync bit information. This decision is then used to enable generation of the SUCCESSFUL ACQUISITION signal, which is then generated at the next occurrence of the correct phase of the bit sync pattern and thereby defines the phase of the first sub-multiple frequency.

In this implementation, the transition from −1 to +1 is chosen as the correct phase. This choice is arbitrary, and was made to simplify the logic design.

The training field pattern as detected by the Viterbi detector, is five bytes of binary value 001100111. This is selected because of the range of frequency components in the corresponding trinary signal from the disk, primarily to facilitate adaptive equalization of the digital cosine equalizer 113 (FIG. 5).

Figure 8:
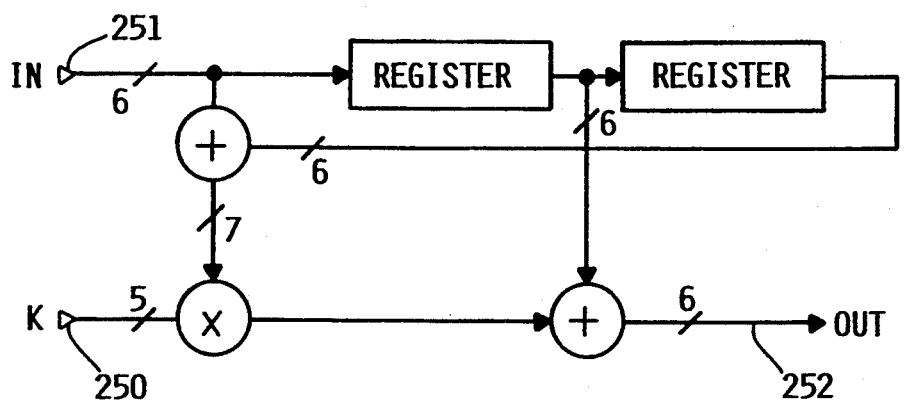
FIG. 8 is a schematic diagram of a digital equalizer circuit employed in the circuit of FIG. 5.

The equalizer is illustrated in FIG. 8 and is needed mainly to compensate for OD to ID radius variations in the disk file. It alters the frequency response of the channel according to the magnitude transfer function $$H(f) = 1 + 2.K. \cos(2\pi f T)$$

The phase transfer function is unity.

Only one parameter 'K' is used to adjust the equalizer by means of an adaptive loop, as shown in FIG. 5. As can be seen in FIG. 8, a five bit K value is applied to input 250 of the equalizer as the six bit A/D encoded sample value of the read back signal from A/D encoder 112 is applied to an input 251. The output at 252 is applied to the Viterbi detector 120 and to the timing error circuit 124.

The 'K' loop is triggered by the first pair of binary zeros in the serial bit stream. For 45 bits (5 bytes) it operates as a closed loop control system; then the loop is opened and the read operation continues with the K value developed at the end of the 45 bit 'training period'.

The K error circuit 114 develops an estimate of the equalization error, ($\Delta k_n$), from the output of the cosine equalizer at each bit subject to misequalization. The bits subject to misequalization are the middle bit in each of the sequences (0,x,1) and (1,x,0); the training pattern 001100111 repeated has 8 out of 9 such bits.

This error estimate is fed to integrator 115 to produce an updated K value, $K_{n+1}$, where $$K_{n+1} = K_n - \delta \Delta k_n$$

The term $\delta$ is the speed of the digital integrator. K is the value used by the cosine equalizer at bit time 'n', and $K_{n+1}$, is the value to be used at the succeeding bit time 'n+1'.

The other major function of the training field is to provide a repetitive timing signal, whose phase coincidence with one selected phase of the bit sync pattern indicates the Byte Sync condition. The read back bytes of training information and data are nine bits long and the selected training pattern is such that all nine possible phases of the byte are uniquely recognisable. The generation of the Byte Sync signal is carried out in PRML channel control chip 44, the relevant portions of which will now be described with reference to FIG. 9 and the corresponding waveform diagram of FIG. 10.

Figure 9:
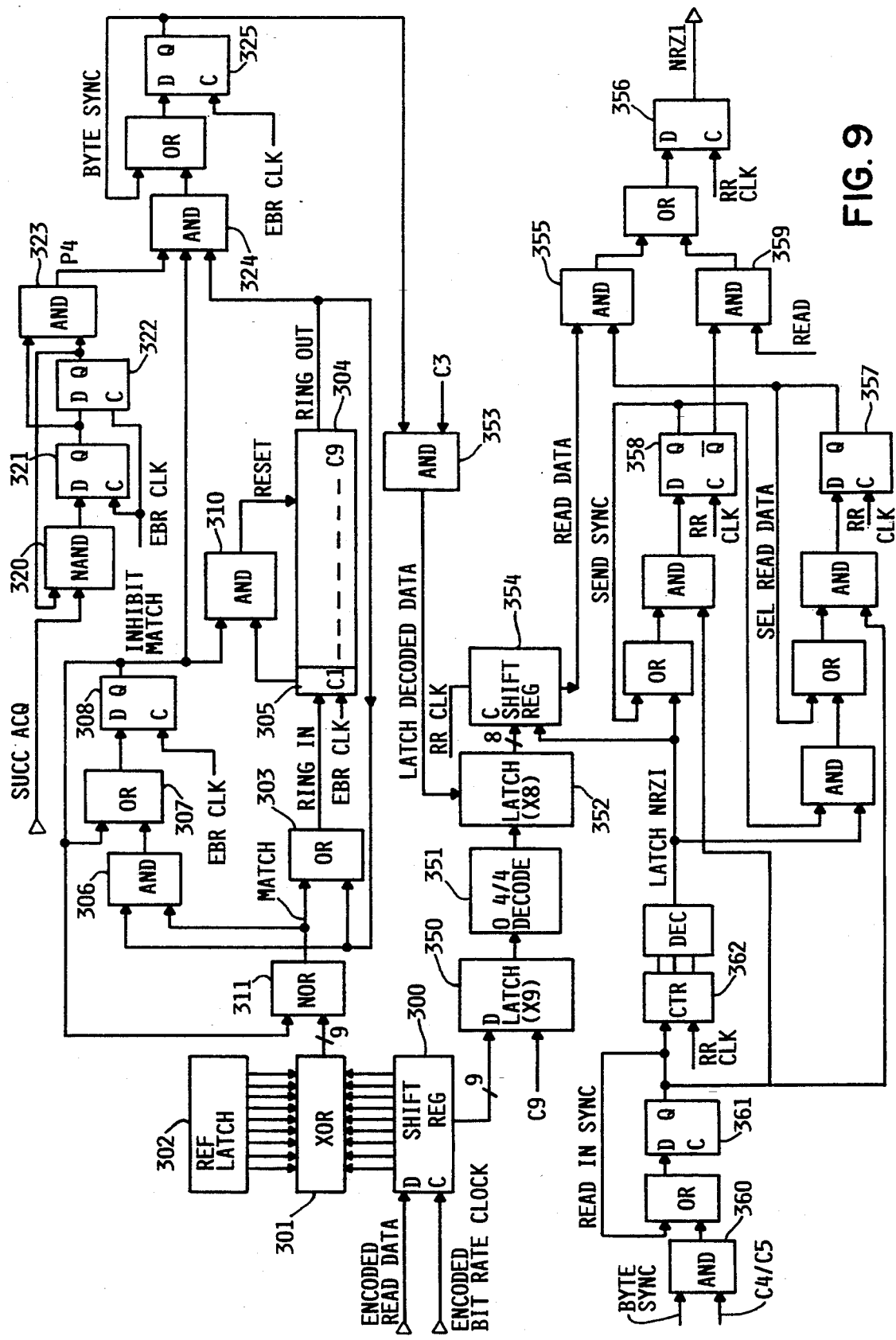
FIG. 9 shows a read logic circuit forming part of the data channel of FIG. 6.

In FIG. 9, the ENCODED READ DATA signal from the Viterbi detector of PRML channel chip 43 is applied to a deserializing nine bit shift register 300 in channel control chip 44. The contents of shift register 300 are compared by multiple XOR circuit 301 with a reference 9 bit training byte pattern held in reference latches 302. Upon a successful comparison, a MATCH signal is produced which indicates that a training byte has been detected in the ENCODED READ DATA and is currently held in the shift register 300.

The MATCH signal is fed to an OR gate 303 whose output is a signal RING IN to a nine bit clocked ring counter 304. The ring counter is clocked by the signal ENCODED BIT RATE CLOCK (not shown in FIG. 10) produced by the clock generation circuitry 143 (FIG. 5) in synchronism with the bit rate of the ENCODED READ DATA. Initially, the ring counter 304 is reset to all zeroes. When the first MATCH (see also FIG. 10) occurs, the first ring element 305 is set to one. This tentatively identifies a byte boundary. The one bit is clocked through the ring at the ENCODED BIT RATE and successive phase outputs C1–C9 may be taken from each stage to control the timing of further operations.

When the next MATCH condition occurs, the initially set bit will just have been output from the last ring counter stage C9 to produce the signal RING OUT. The RING OUT and MATCH signals are applied to AND gate 306 and, via OR gate 307, set a D type latch 308 whose output is a signal INHIBIT MATCH. This signal remains up at subsequent clock times because of feedback around the latch 308 via OR 307. The INHIBIT MATCH signal indicates that two MATCH signals have occurred and is used to deny further tentative matches. It does this by resetting all stages of the ring counter except stage 305 to 'O' via AND 310 and by disabling the output of the compare circuit 301 by means of NOR gate 311.

Byte boundaries have now been determined by detecting two training patterns in the same phase of the ring counter to establish a corresponding 1 in 9 phase timing signal at the output of the ring counter to serve as a byte clock. This, of itself, does not, however, determine the start of the first data byte at the end of the training bytes i.e. The BYTE SYNC condition.

To generate BYTE SYNC, the circuit of FIG. 9 compares the 1 in 9 phase timing signal RING OUT with a 1 in 4 phase signal derived from the ENCODED BIT RATE CLOCK. Although the 1 in 4 phase signal would be available from the sequence control circuit 150 (FIG. 5) in chip 43, it is not passed to the channel control chip 44.

Instead the desired signal is generated by dividing the ENCODED BIT RATE CLOCK by four and selecting the phase which coincides with the signal SUCCESSFUL ACQUISITION from the chip 43. In FIG. 9, SUCCESSFUL ACQUISITION is applied to a NAND gate 320 whose output is applied to the D input of two D type latches 321 and 322, arranged in a two stage counter configuration. The ENCODED BIT RATE CLOCK is applied to the clocking input of both latches. An AND circuit 323 receives the outputs of the two latches to produce the signal P4 (FIG. 10) in the desired phase relationship.

Finally, the BYTE SYNC signal is produced from an AND circuit 324 whose inputs are the 1 in 4 phase signal P4, the 1 in 9 phase signal C9 and the INHIBIT MATCH signal. The output of AND 324 is latched by LATCH 325 whose output is BYTE SYNC (Ref FIG. 10).

By only requiring two of the possible five training bytes to be recognized to determine the 1 in 9 phase, the circuit is relatively error tolerant in contrast to a conventional byte synchronization operation where recognition of all bits would be required.

The remainder of the circuit of FIG. 9 will not be described to explain how NRZI information is provided back to the disk controller. The shift register 300 contains nine bit bytes from the Viterbi decoder which must be (0, 4/4) decoded and serialized as NRZI bits. This is achieved by means of a nine bit latch 350 which latches the contents of the shift register 300 at the C9 phase of the ring counter, i.e. on the correct byte boundaries. The latched data is passed to the (0,4/4) decoder 351 and decoded into an eight bit pattern. This pattern is latched by latch 352 in response to a LATCH DECODED DATA signal. This signal is produced by AND 353 at the first C3 phase to occur after BYTE SYNC is raised.

The contents of latch 352 are transferred to an eight bit shift register 354 and read out at a reduced rate determined by a signal RRCLK. The output from the shift register 354 is the READ DATA signal which is gated out through AND 355 and latch 356 as NRZI data to the controller chip 41 (FIG. 4).

The remaining circuitry of FIG. 9 is concerned with the transition between the training and data bytes. The controller 41 (FIG. 4) is programmed to expect an arbitrary number of all '1' bits followed by an all 0's byte, before the start of real data.

Figure 10:
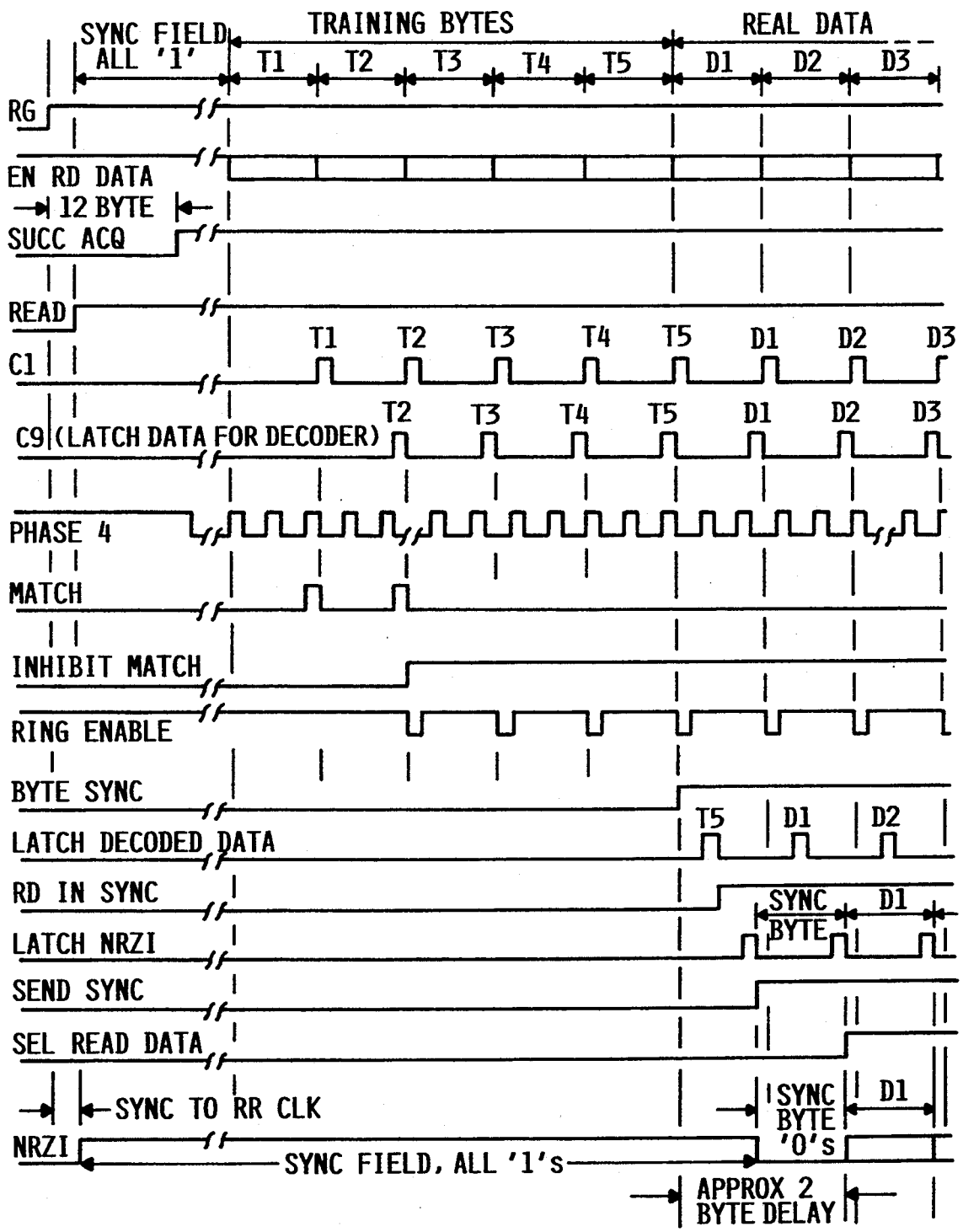
FIG. 10 shows waveforms occurring in the read-logic circuit of FIG. 9.

With reference also to the timing diagram of FIG. 10, this is achieved by applying the BYTE SYNC signal and subsequent C4 phase to an AND 360 whose output sets a latch 361 to raise a signal READ IN SYNC. This enables a 3-bit counter 362 one of whose decoded outputs is a signal LATCH NRZI. The LATCH NRZI signal gates shift register 354 to cause read out of its contents as READ DATA to AND 355.

The READ DATA signal is not passed through AND 355 as its enabling input SEL READ DATA from a latch 357 is not up. Since a further latch 358 is also not set, the NRZI output is determined by the READ signal applied to AND 359. This is predetermined to cause the NRZI output to be all "ones" for as long as necessary.

At the end of one byte, latch 358 is set by the first LATCH NRZI signal and produces a signal SEND SYNC. The output of AND 359 falls and NRZI zeroes are output for one byte. The SEND SYNC signal and the second LATCH NRZI pulse enable a further AND 360 with the result that latch 357 is set to produce SEL READ DATA. The READ DATA from shift register 354 is then output as NRZI starting with the delayed data byte 1.

Having described the detection and generation of BYTE SYNC and its use in synchronizing NRZI data from the disk sent back to the file controller and SCSI interface, it remains to describe the generation of the bit sync and training byte patterns in correct relationship with the data to be recorded.

The disk file as supplied has disks which are already formatted according to fixed block architecture. That is to say they already have ID and Data fields preceded by bit sync and training byte information written in the factory. However, whenever information in the Data fields is written by the user, it is necessary to rewrite bit sync and training byte patterns before writing the data to ensure subsequent synchronism within the field.

The operation is controlled by the disk file controller 41 which is actually a sequencer whose operation is defined by a microprogram. The following is an exemplary sequence of operations for writing new data and can be best understood with reference to the formats of FIG. 6.

| WRITE DATA MICROPROGRAM |
| --- |
| Step No. - |
| 0. wait for sector mark from disk servo to indicate approach of ID field; |
| 1. Assert READ GATE and pass through bit sync and training regions of ID field; |
| 2. Compare NRZI data from PRML channel to identify byte of 0's indicating synchronization complete; |
| 3. Compare read back data for target ID address |
| 4. Pass ID flag (checks for correct track) |
| 5. Check ID CRC; |
| 6. Retry if mismatch; |
| 7. Start Write Logic for Data Fields by asserting WRITE GATE; |
| 8. Write 17 bytes of bit sync 1's as NRZO data to the PRML channel |
| 9. Write training bytes to the PRML channel. |
| 10. Write up to 520 data bytes; |
| 11. Write 6 bytes of ECC; |
| 12. Allow write data path to flush at end of sector; |
| 13. Stop the sequencer. |

Figure 11:
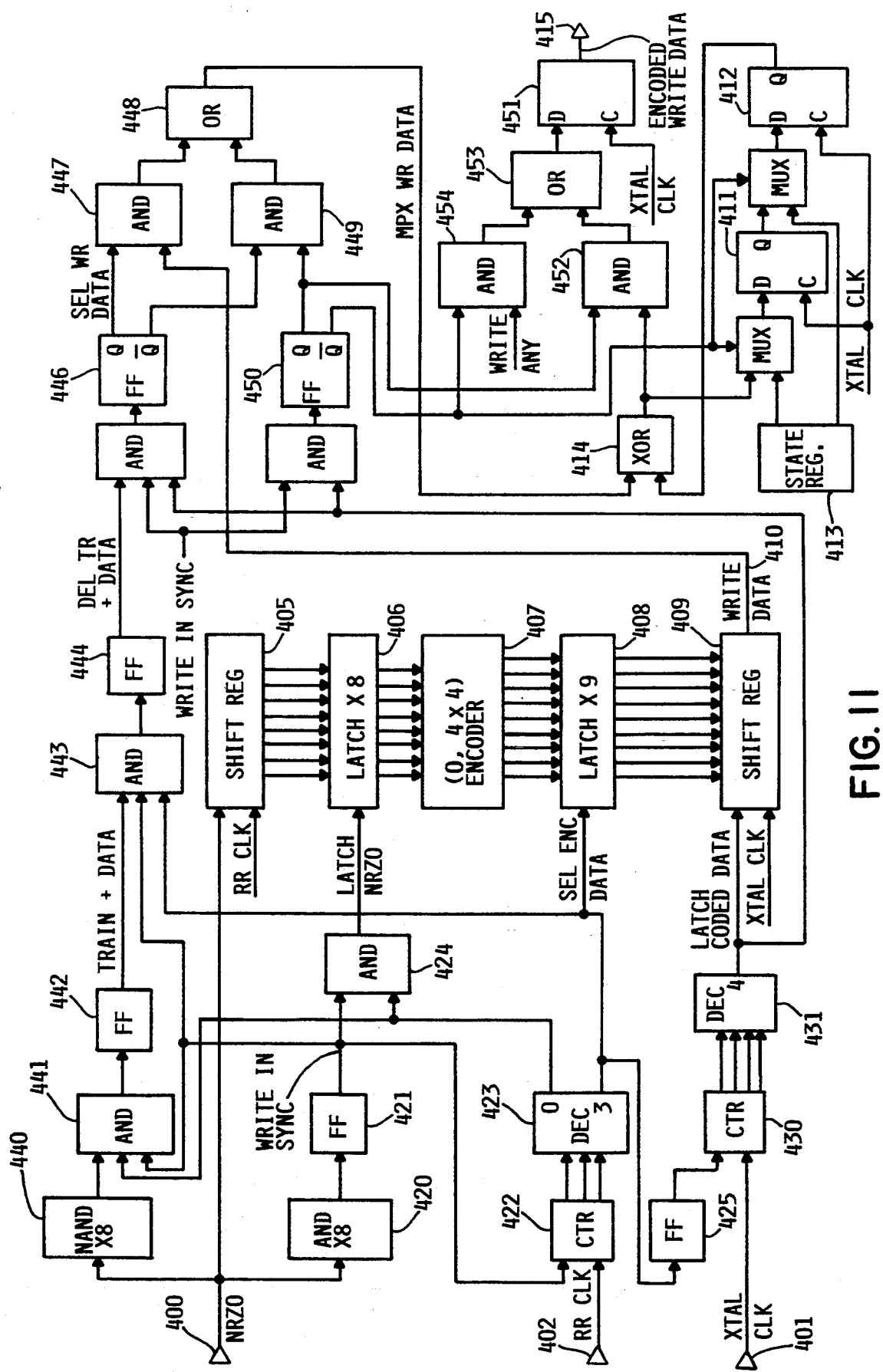
FIG. 11 shows a write logic circuit forming part of the data channel of FIG. 6.
Figure 12:
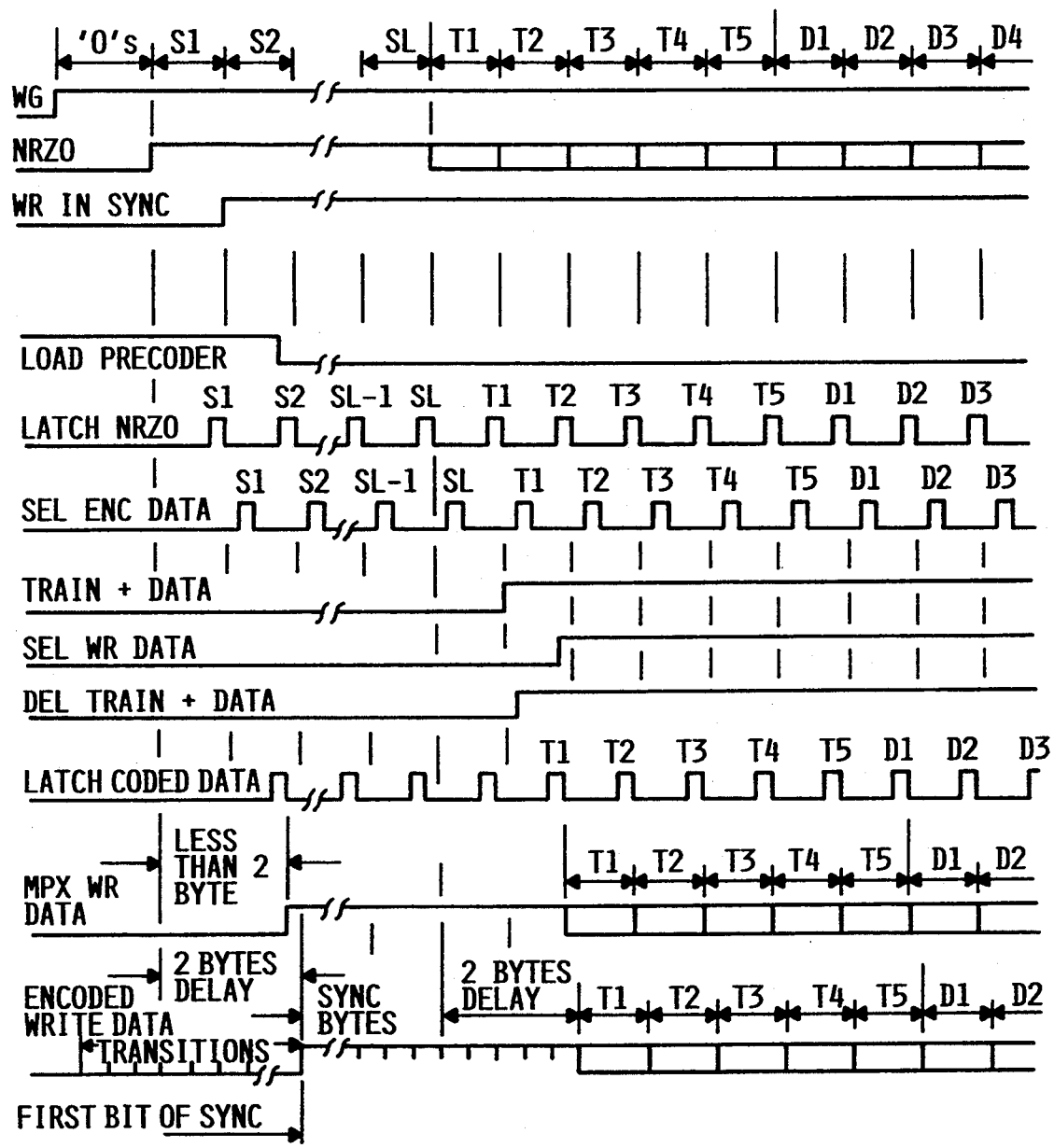
FIG. 12 shows waveforms occurring in the write logic circuit of FIG. 11.

The circuitry responsive to the above signals from the disk controller is the write logic circuitry in the PRML channel control chip 44. This is illustrated in FIG. 11 and its operation will be described with reference to the timing diagram of FIG. 12. In order to aid description, FIG. 11 has been somewhat simplified.

The circuit receives NRZO data from the controller at input 400 and also received two clock inputs. At input 401, a signal XTAL CLK derived from an external crystal clock is applied. This clock rate is set at the desired 9 bit byte rate for recording the output ENCODED WRITE DATA signal on the disk. A reduced rate clock RR CLK is also provided at input 402. This corresponds to the eight bit byte rate of uncoded NRZO data. Logic operations take place sequentially at times derived from the input NRZO data and counts of the two clock outputs. Main data flow is that NRZO data is clocked into 8 bit shift register 405 and latched in 8 bit latch 406 in response to a phase signal LATCH NRZO. The latched data is (0, 4/4) encoded by encoder 407 and latched into a latch 9 bit latch 408 in response to a SEL ENC DATA pulse. Next, a shift register 409 is loaded in response to a LATCH CODED DATA pulse and the encoded data is serialized as a signal WRITE DATA on line 410 at the XTAL CLK rate.

After passage through a multiplexing circuit the WRITE DATA is applied as the signal MPX WR DATA to a precoder circuit, equivalent to the precoder 15 of FIG. 1. The precoder output is clocked out at output 415 as the ENCODED WRITE DATA signals to the PRML channel chip 43.

The various timing signals are produced in the following manner. The NRZO output from the disk controller 41, after write gate (WG) is asserted, is at least ten bits of zeroes follow by exactly 17 bit sync bytes of ones (S1-SL). The 8 way AND circuit 420 recognises the first eight ones and sets a flip flop 421 to raise a signal WR IN SYNC.

The WR IN SYNC signal enables a cyclic 3 bit counter 422 to start counting the RR CLK cycles. A decoder 423 indicates byte boundaries and bit timing within an eight bit byte. The Decoder 0 output together with WR IN SYNC is applied to AND gate 424 to produce the LATCH NRZO timing pulses on the byte boundaries.

The Decoder 3 output is the SEL ENC DATA signal to latch 408 and is further applied to set flip-flop 425. The setting of this flip flop enables a second counter 430 to count the XTAL CLK cycles. Its output is decoded by decoder 431 to give timing information in the nine bit byte cycle. The Decode 4 output of decoder 431 is the signal LATCH CODED DATA which loads shift register 409.

The first byte of bit sync (11111111 after the zeros) on the NRZO input 400, causes AND 420 to provide an output which sets latch 421 to indicate that the disk controller 41 is in synchronism for writing and that the phase of the first sub-multiple frequency must now be defined.

To arrange that the phase of training will be correct with respect to the phase of bit sync, the precoder is forced to the correct state at the start of the bit sync by the D-type latch 450. The required initial states of the two D-type latches in the precoder are determined by the number of bits of bit sync to be written, modulo 4. In this design, 17 bytes (of 9 bits each) of bit sync are written, and the required precoder states are '0' in latch 411 and '1' in latch 412. These initial states are held in register 413.

A multiplexing circuit (447,448, 449) inserts Bit Sync into the data stream as required. Although the Bit Sync pattern satisfies the (0,4/4) code constraint, it is deliberately not one of the patterns in the encoder 407 and so could not be supplied directly from the disk controller 41.

The first byte of the training sequence from the disk controller 41 is detected by NAND 440, AND 441 and latch 442. This switches multiplexer (447,448, 449) and from then on the data path is via shift register 405, latch 406, encoder 407, latch 408, and shift register 409.

Any byte other than '11111111' on input 400 would cause that switch to happen. Byte '00111111' is used in practice, as this is encoded to the required training pattern '001100111'.

The entire bit sync, training byte, and data sequence is passed through the precoder via XOR 414.

A further multiplexer (452,453,454) is available to insert transitions from 'WRITE ANY' into the data stream, during the short period at the start of a write operation until the precoder load is complete.

In summary, the phase of the first sub-multiple frequency (bit sync) is arranged with respect to the phase of the second sub-multiple frequency (training pattern) by the combination of the precoder load at the start of write, and the count (modulo 4) of the number of bits of bit sync written.

The byte recognised by the coincidence circuitry of FIG. 9 in generating BYTE SYNC also depends on the number of bits of bit sync written before the first training byte, the selected phase of bit sync where the PRML channel raises SUCCESSFUL ACQUISITION and on whether the differential linear signal is phase inverted between 'write' and 'read'. To guarantee that the correct byte is recognised, the latter three items must be constant and the state of the write precoder must be programmable.

Thus, BYTE SYNC is recognised by a coincidence of clocks occurring every four bits and every 36 bits. The first such coincidence after two bytes of training is taken to be the correct start of data. The possible error mechanisms are pattern mismatches on four or five equalizer training bytes; 'alias' matches in which two bytes of training are detected in the same incorrect phase; and failure to detect bit sync.

I claim:
1. A asynchronous data channel comprising:
    means (45,60) for detecting an asynchronous signal (30) in which fields (211) of digital data, which are synchronous within the field at a bit rate frequency, are separated by adjustment regions (213, 214, 215), the adjustment regions including a first pattern of control signals (213, 214) which repeats at a first submultiple of the bit rate frequency and a second pattern of control signals (215) which repeats at a second submultiple of the bit rate frequency,
    means (140, 143, 150, 320–323) coupled to said means for detecting and responsive to said first pattern in said asynchronous signal for producing a first clock signal at said first submultiple frequency,
    means (301,302, 304) coupled to said means for detecting and responsive to said second pattern in said asynchronous signal for producing a second clock signal at said second submultiple frequency, and
    means (324, 325) coupled to both of said means for producing, for detecting phase coincidence of said first and second clock signals and producing a synchronizing signal, in fixed time relationship to said coincidence detection, which synchronizing signal indicates the start of the data field.
2. A data channel as claimed in claim 1 further including:
    means (100, 110, 112) for sampling the asynchronous signal;
    an adaptive equalizer (113) for equalizing the sampled asynchronous signal in accordance with an adjustment signal supplied at a control input of the equalizer;
    adjustment means (114, 115) responsive to that portion of the equalized sample asynchronous signal from the equalizer which represents said second pattern of control signals to generate said adjustment signal and apply it to said equalizer control input; and
    a maximum likelihood sequence estimator (120) for determining from the equalizer output the likeliest binary sequence to have produced the asynchronous signal.

3. A data channel as claimed in claim 1 in which the means for producing the first clock signal includes a phase locked oscillator (140) arranged to lock to the phase of said first pattern of control signals, and the means for deriving the second clock signal includes a clocked ring counter (304).

4. A data channel as claimed in claim 3 in which the means for producing the second clock signals includes a pattern recogniser (301, 302) for recognising said second pattern of control signals and whose output is connected as an input to said ring counter to synchronize the output of the ring counter with said second pattern.

5. A data channel as claimed in claim 4 including inhibiting means (306, 307,308, 311) responsive to a predetermined number of subsequent recognitions of said second pattern of control signals in coincidence with the output of the ring counter to inhibit further output from the pattern recogniser.

6. A method of generating an asynchronous signal comprising data fields, within which data is synchronous at a predetermined bit rate frequency, separated by adjustment regions, the method comprising:

generating serially in each adjustment region of said signal first and second control signal patterns at said predetermined bit rate frequency, the first pattern having a phase repeating at a first submultiple of the bit rate frequency and the second pattern having a phase repeating at a second submultiple of the bit rate frequency; and producing a phase coincidence at the end of the second pattern in response to the relationship between the phases of the first and second patterns;

and generating, in a data field of said signal following that adjustment region, data at said bit rate frequency starting at a time determined by said coincidence in phase.

7. A method of detecting data in an asynchronous signal generated by the method of claim 6 comprising the steps of:

deriving from said first control signal pattern a first clock signal having a phase repeating at said first submultiple frequency;

deriving from said second control signal pattern a second clock signal having a phase repeating at said second submultiple frequency;

detecting a coincidence between the phases of said first and second clock signals to indicate the start of the data field;

and separating signals in said data field from said control signals for further processing.

8. A method of detecting data in an asynchronous signal generated by the method of claim 6 comprising the steps of:

sampling the asynchronous signal;

equalizing the signal samples;

feeding back equalized samples corresponding to said second control signal pattern;

adjusting said equalization step adaptively in accordance with said fed back samples; and applying the adaptively equalized samples to a maximum likelihood sequence estimator.

* * * * *